United States Patent
Park

(10) Patent No.: US 8,334,824 B2
(45) Date of Patent: Dec. 18, 2012

(54) ORGANIC LIGHT EMITTING DISPLAY HAVING DC-DC CONVERTER

(75) Inventor: Sungcheon Park, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 791 days.

(21) Appl. No.: 11/966,797

(22) Filed: Dec. 28, 2007

(65) Prior Publication Data

US 2008/0174287 A1  Jul. 24, 2008

(30) Foreign Application Priority Data

Jan. 22, 2007 (KR) .................. 10-2007-0006545

(51) Int. Cl.
G09G 3/32 (2006.01)

(52) U.S. Cl. ................ 345/82; 345/211; 341/50

(58) Field of Classification Search .......... 345/82, 345/83, 204, 211–213; 341/50–107
See application file for complete search history.

(56) References Cited

U.S. PATENT DOCUMENTS

| | | | |
|---|---|---|---|
| 4,736,151 A | | 4/1988 | Dishner |
| 5,412,308 A | | 5/1995 | Brown |
| 2001/0004204 A1 | | 6/2001 | Mitsuaki |
| 2002/0060673 A1 | | 5/2002 | Noritake et al. |
| 2003/0090245 A1 | | 5/2003 | Shenai et al. |
| 2004/0012584 A1 | * | 1/2004 | Sasaki et al. .......... 345/204 |
| 2004/0027104 A1 | * | 2/2004 | Ishii et al. .......... 323/267 |
| 2005/0237001 A1 | | 10/2005 | Hayafuji |
| 2006/0066531 A1 | * | 3/2006 | Park et al. .......... 345/76 |
| 2006/0097707 A1 | | 5/2006 | Inoshita et al. |
| 2006/0116843 A1 | * | 6/2006 | Kodera .......... 702/124 |
| 2007/0018614 A1 | | 1/2007 | Effing |
| 2007/0091036 A1 | * | 4/2007 | Han et al. .......... 345/82 |

FOREIGN PATENT DOCUMENTS

| | | |
|---|---|---|
| CN | 1409288 A | 4/2003 |
| CN | 1753069 A | 3/2006 |
| EP | 1 365 632 A1 | 11/2003 |

(Continued)

OTHER PUBLICATIONS

Publication—LM2575: 1.0 A, *Adjustable Output Voltage, Step-Down Switching Regulator*, Semiconductor Components Industries, LLC, Nov. 2005, Rev. 8, http://onsemi.com, pp. 1-28.

(Continued)

*Primary Examiner* — Liliana Cerullo
(74) *Attorney, Agent, or Firm* — Christie, Parker & Hale, LLP

(57) ABSTRACT

An organic light emitting display having a DC-DC converter with freewheel diodes replaced by switches integrated into a switching controller. This way, power consumption is reduced by truly shutting down a current path when the DC-DC converter does not operate, and the size and weight of the DC-DC converter may be reduced. One embodiment of the DC-DC converter has a boost converter with a first switch coupled to a power supplier and a second switch, functioning as a freewheel diode, coupled to an organic light emitting display panel, and an inverter with a third switch coupled to the power supplier and a fourth switch, functioning as a freewheel diode, coupled to the organic light emitting display panel. A switching controller is coupled to the boost converter and the inverter. The second and fourth switches, which function as the freewheel diodes, are integrated into the switching controller.

21 Claims, 10 Drawing Sheets

FOREIGN PATENT DOCUMENTS

| | | |
|---|---|---|
| JP | 07-213049 A | 8/1995 |
| JP | 08-242577 | 9/1996 |
| JP | 2001-178121 A | 6/2001 |
| JP | 2005-315919 A | 11/2005 |
| JP | 2006-091839 A | 4/2006 |
| JP | 2006-136125 A | 5/2006 |
| JP | 2006-276713 | 10/2006 |
| KR | 2003-0003684 | 1/2003 |
| KR | 2003-0024607 | 3/2003 |
| KR | 10-2004-0072611 A | 8/2004 |
| KR | 10-2005-0111392 A | 11/2005 |
| TW | 1221595 B | 10/2004 |
| TW | 200525862 | 8/2005 |

OTHER PUBLICATIONS

Korean Patent Abstracts, Publication No. 1020030003684 A, dated Jan. 10, 2003, in the name of Song I Han et al.
Korean Patent Abstracts, Publication No. 1020030024607 A, dated Mar. 26, 2003, in the name of Jun Koyama Han et al.
Korean Patent Abstracts, Publication No. 10-2004-0072611, dated Aug. 18, 2004, in the name of Gilbert Macdonald et al.
Korean Patent Abstracts, Publication No. 10-2005-0111392, dated Nov. 24, 2005, in the name of Thomas J. Ribarich et al.
European Search Report dated May 8, 2008 in corresponding European application No. EP 08 15 0486.2.
SIPO Office action dated Jul. 10, 2009 in corresponding Chinese application No. 2008100026237.
English Machine Translation of Japanese Publication 07-213049, 4 pages.
English Machine Translation of Japanese Publication 08-242577, 5 pages.
English Machine Translation of Japanese Publication 2006-276713, 94 pages.
Japanese Office Action dated Mar. 29, 2011 issued by the JPO corresponding to the Japanese Patent Application No. 2007-324753, 3 pages.
Taiwanese Office action dated Mar. 16, 2012, for corresponding Taiwanese Patent application 096151498, (13 pages).

* cited by examiner

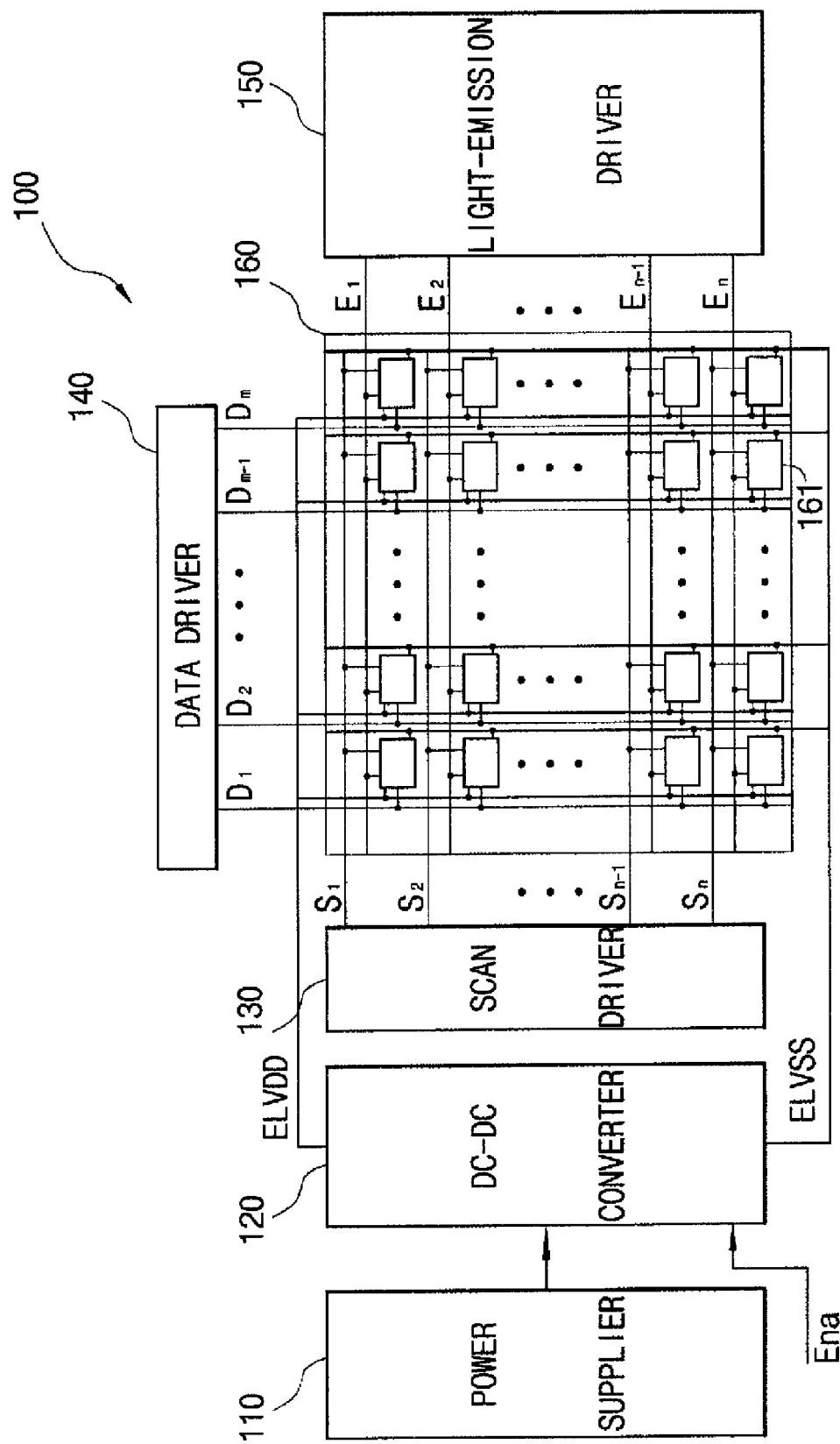

ORGANIC LIGHT EMITTING DISPLAY HAVING DC-DC CONVERTER

CROSS-REFERENCE TO RELATED APPLICATION

This application claims priority to and the benefit of Korean Patent Application No. 10-2007-0006545, filed Jan. 22, 2007, in the Korean Intellectual Property Office, the entire content of which is incorporated herein by reference.

BACKGROUND OF THE INVENTION

1. Field of the Invention

The present invention relates to an organic light emitting display having a DC-DC converter.

2. Description of the Related Art

DC-DC converters are generally used to convert a direct current (DC) voltage of a power supplier to have an appropriate voltage for electronic equipment such as a mobile phone, a personal digital assistant (PDA), a portable multimedia player (PMP), an MP3 player, a digital camera, or a camcorder.

When an organic light emitting display is used as a display for the electronic equipment, the DC-DC converter should concurrently supply a positive power voltage and a negative power voltage to the organic light emitting display.

To this end, the DC-DC converter may include a boost converter that outputs a positive power voltage and an inverter that outputs a negative power voltage. Both the boost converter and the inverter may include an inductor, a switch, a freewheel diode, and a capacitor. And, the DC-DC converter may include a switching controller for controlling each switch of the boost converter and the inverter. As described above, the DC-DC converter that outputs two output voltages is generally called a dual output converter. Further, the switching controller may be integrated into one semiconductor chip.

As described above, the DC-DC converter including the boost converter and the inverter generally has two freewheel diodes for circulating energy. Each freewheel diode is electrically coupled outside the switching controller, which is integrated in one semiconductor chip, and causes a voltage drop of approximately 0.4 to 0.7V. Therefore, there is a problem in that the power consumption is high and the overall size and the weight of the DC-DC converter is increased.

Further, since the above-described freewheel diodes are coupled in the power supply direction, that is, the forward direction, the power of the power supply may be continuously supplied to the organic light emitting display even when the switching controller does not operate. In other words, the conventional DC-DC converter cannot be truly shut down due to the freewheel diode. Therefore, the power of the power supplier is continuously supplied to the organic light emitting display even when the DC-DC converter or the switching controller does not operate. Accordingly, there are problems in that the power of the power supplier is consumed and the organic light emitting display deteriorates.

SUMMARY OF THE INVENTION

Accordingly, exemplary embodiments of the present invention have been contrived to solve the above-described drawbacks, and an aspect of exemplary embodiments of the present invention is to provide an organic light emitting display having a DC-DC converter with low power consumption by replacing a freewheel diode with a switch having a low voltage drop.

Another aspect of exemplary embodiments of the present invention is to provide an organic light emitting display having a light-weight and small size DC-DC converter by integrating the switches, which act as freewheel diodes, with a switching controller.

Another aspect of exemplary embodiments of the present invention is to provide an organic light emitting display having a DC-DC converter which can be truly shut down by causing a switch of a boost converter and a switch of an inverter, which function as the freewheel diodes, to be completely turned off when the switching controller does not operate.

To accomplish these goals, there is provided an organic light emitting display including a power supplier, a DC-DC converter, a scan driver, a data driver, and an organic light emitting display panel. The DC-DC converter includes a boost converter with a first switch electrically coupled to the power supplier, and a second switch electrically coupled to the power supplier, the first switch, and the organic light emitting display panel. The DC-DC converter further includes an inverter with a third switch electrically coupled to the power supplier and a fourth switch electrically coupled to the third switch and the organic light emitting display panel. In addition, the DC-DC converter includes a switching controller electrically coupled to the boost converter and the inverter.

BRIEF DESCRIPTION OF THE DRAWINGS

FIG. 1 is a block diagram illustrating an organic light emitting display having a DC-DC converter according to an exemplary embodiment of the invention;

FIG. 6 is a graph illustrating the state in which a first switch and a second switch of a boost converter and a third switch and a fourth switch of an inverter included in the DC-DC converter are turned on;

DETAILED DESCRIPTION OF EMBODIMENTS

Figure 2A:
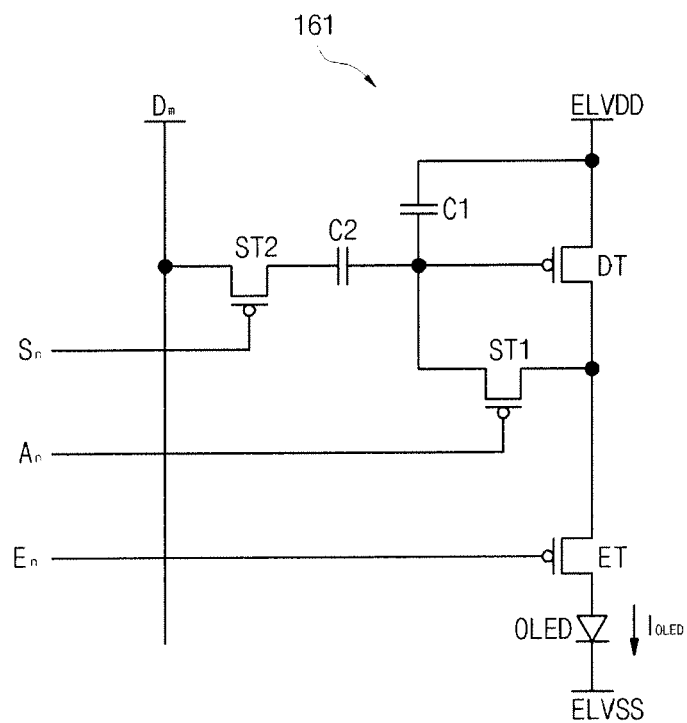
FIG. 2a is a circuit diagram and FIG. 2b is a timing diagram illustrating an example of circuitry and operation of a pixel region of the organic light emitting display.

FIG. 1 is a block diagram illustrating an organic light emitting display having a DC-DC converter according to an embodiment of the invention.

As illustrated in FIG. 1, an organic light emitting display 100 includes a power supplier 110, a DC-DC converter 120, a scan driver 130, a data driver 140, a light-emission driver 150, and an organic light emitting display panel 160.

The power supplier 110 may be a battery that supplies a DC power supply or a rectification device that converts an AC power supply into a DC power supply and outputs the converted DC power supply. However, the invention is not limited to these kinds of power supplier 110.

The DC-DC converter 120 may be electrically coupled between the power supplier 110 and the organic light emitting display panel 160. Here, for the convenience of description, the positive power voltage is denoted by the same reference symbol as that of the positive power voltage line (ELVDD) and the negative power voltage is denoted by the same reference symbol as that of the negative power voltage line (ELVSS). The DC-DC converter 120 converts the power supply received from the power supplier 110 into a positive power voltage (ELVDD) and a negative power voltage (ELVSS), which are used to drive the organic light emitting display 100, and provides the converted positive power voltage (ELVDD) and the negative power voltage (ELVSS) to the organic light emitting display 100. To this end, the DC-DC converter 120 may be electrically coupled to the organic light emitting display 100 through a positive power voltage line (ELVDD) and a negative power voltage line (ELVSS). In particular, the DC-DC converter 120 supplies the positive power voltage (ELVDD) to the organic light emitting display panel 160 through the positive power voltage line (ELVDD). Further, the DC-DC converter 120 supplies the negative power voltage (ELVSS) to the organic light emitting display panel 160 through the negative power voltage line (ELVSS).

The DC-DC converter 120 may further include an enable terminal (Ena). The DC-DC converter 120 operates when an enable signal is input through the enable terminal (Ena). The DC-DC converter 120 does not operate when a disable signal is input through the enable terminal (Ena). That is, when the disable signal is input through the enable terminal (Ena), little or no power is supplied from the power supplier 110 to the organic light emitting display panel 160 through the DC-DC converter 120. In other words, when the disable signal is input through the enable terminal (Ena), the DC-DC converter 120 is truly shut down.

The scan driver 130 may be electrically coupled to the organic light emitting display panel 160. That is, the scan driver 130 may be electrically coupled to the organic light emitting display panel 160 through a plurality of scan lines (S1, . . . , Sn). In particular, the scan driver 130 sequentially supplies scan signals to the organic light emitting display panel 160 through the plurality of scan lines.

The data driver 140 may be electrically coupled to the organic light emitting display panel 160. That is, the data driver 140 may be electrically coupled to the organic light emitting display panel 160 through a plurality of data lines (D1, . . . , Dm). In particular, the data driver 140 sequentially supplies data signals to the organic light emitting display panel 160 through the plurality of data lines.

The light-emission driver 150 may be electrically coupled to the organic light emitting display panel 160. That is, the light-emission driver 150 may be electrically coupled to the organic light emitting display panel 160 through a plurality of emission lines (E1, . . . , En). In particular, the light-emission driver 150 sequentially supplies emission signals to the organic light emitting display panel 160 through the plurality of emission lines.

In the organic light emitting display panel 160, the plurality of scan lines (S1, . . . , Sn) and the plurality of emission lines (E1, . . . , En) are arranged to extend in a row direction, the plurality of data lines (D1, . . . , Dm) are arranged to extend in a column direction, and a plurality of pixel circuits 161 may be formed in regions defined by the scan lines (S1, . . . , Sn), the emission lines (E1, . . . , En), and the data lines (D1, . . . , Dm). In particular, the pixel circuit 161 may be formed in a region defined by two scan lines (or emission lines) that are adjacent to each other and two data lines that are adjacent to each other.

On the other hand, the scan driver 130, the data driver 140, the light-emission driver 150, and the organic light emitting display panel 160, which are illustrated in FIG. 1, may be formed on one substrate. In particular, the drivers may be formed on one substrate in the form of an integrated circuit. And, the drivers may be formed on the same layer as a layer on which the scan lines (S1, . . . , Sn), the data lines (D1, . . . , Dm), the emission lines (E1, . . . , En), and transistors (not illustrated) of the pixel circuit are formed. The drivers may be formed on a separate, different substrate (not illustrated) from the above-described substrate and the different substrate may be electrically coupled to the above-described substrate. Further, the drivers may be formed on any one of a flexible printed circuit (FPC), a tape carrier package (TCP), a tape automatic bonding (TAB), a chip on glass (COG), or a substantially equivalent material thereof, which is electrically coupled to the substrate, but the invention is not limited thereto. That is, the shape or position of the driver is not limited to the described embodiments.

Figure 2B:
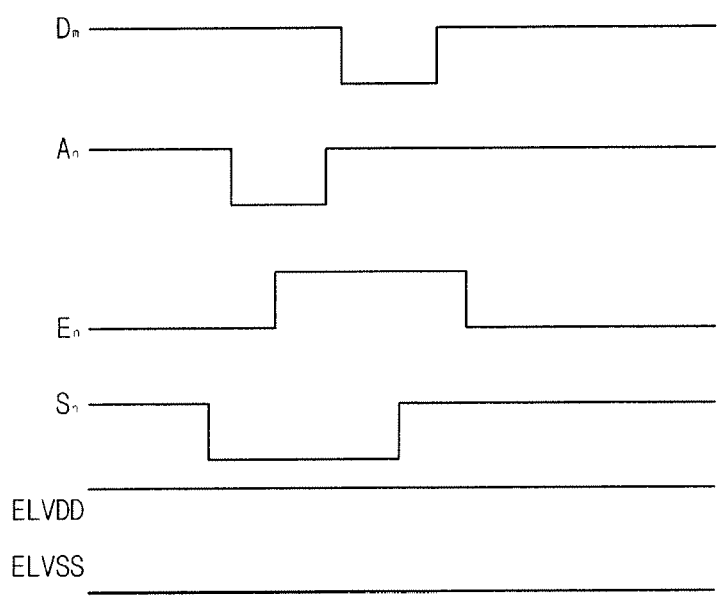

FIG. 2a is a circuit diagram and FIG. 2b is a timing diagram illustrating an example of circuitry and operation of a pixel circuit of the organic light emitting display.

Here, one example of the pixel circuit is described so as to aid in understanding the invention, but the invention is not limited thereto. That is, the DC-DC converter according to this embodiment of the invention may be applied to pixel circuits of all organic light emitting displays which have been known until now or will be known in the future in addition to the pixel circuits illustrated in the drawings.

As illustrated in FIG. 2a, the pixel circuit 161 includes a scan line (Sn) used to supply a scan signal, a data line (Dm) used to supply a data signal, an auto zero line (An) used to supply an auto zero signal, an emission line (En) used to supply an emission signal, a positive power voltage line (ELVDD) used to supply a positive power voltage, a negative power voltage line (ELVSS) used to supply a negative power voltage, a driving transistor (DT), first and second switches (ST1 and ST2), an emission transistor (ET), first and second capacitors (C1 and C2), and an organic light emitting diode (OLED).

Here, the positive power voltage line (ELVDD) and the negative power voltage line (ELVSS) may be electrically coupled to the DC-DC converter 120, the scan line (Sn) may be electrically coupled to the scan driver 130, the data line (Dm) may be electrically coupled to the data driver 140, and the emission line (En) may be electrically coupled to the light emission driver 150. Further, the auto zero line (An) may be electrically coupled to the light emission driver 150 or electrically coupled to a separate driving unit.

In the pixel circuit, when an auto zero signal is supplied at a low level on the auto zero line (An) to a control electrode of the first switch (ST1), the first switch (ST1) is turned on. Next, when an emission signal at a high level is supplied to the control electrode of the emission transistor (ET) from the emission line (En), the emission transistor (ET) is turned off. Thereafter, the driving transistor (DT) is coupled to function as a diode and a threshold voltage of the driving transistor (DT) is stored in the first capacitor (C1). When the auto zero signal An becomes a high level and a scan signal is supplied at a low level to a control electrode of the second switch (ST2) from the scan line (Sn), the second switch (ST2) is turned on. Thereafter, a data voltage corresponding to a grayscale level to be displayed is applied to the second capacitor (C2) from the data line (Dm). Accordingly, a data voltage in which the threshold voltage is compensated by a coupling ratio between the first capacitor (C1) and the second capacitor (C2) is applied to a control electrode of the driving transistor (DT). Continuously, when an emission signal (En) is supplied at a low level from the emission line (En) to a control electrode of the emission transistor (ET), the emission transistor (ET) is turned on. Accordingly, currents supplied from the first power voltage line (ELVDD) flow into the organic light emitting diode (OLED) through the driving transistor (DT), which functions as a current source managed by the data voltage.

Figure 3:
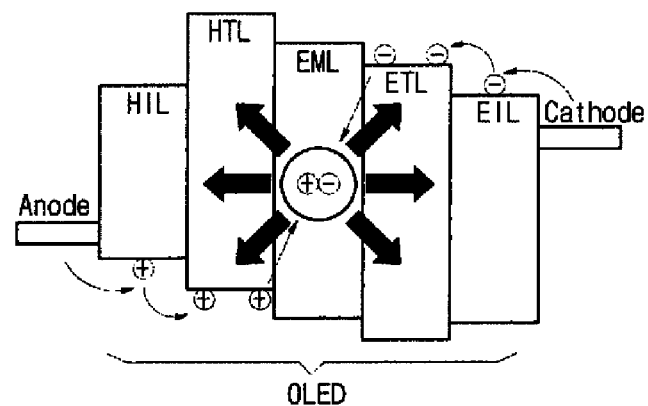
FIG. 3 is a cross sectional view illustrating an organic light emitting diode in the pixel region of the organic light emitting display.

FIG. 3 is a cross sectional view illustrating an example of an organic light emitting diode in the pixel region of the organic light emitting display.

As illustrated in FIG. 3, an anode and a cathode are formed on opposite sides of the organic light emitting diode (OLED). The organic light emitting diode (OLED) may include a light emitting layer (EML) in which electrons are combined with holes, thereby forming excitons and emitting light. The OLED may also include an electron transport layer (ETL) in which electrons are transported, and a hole transport layer (HTL) in which holes are transported. Further, the organic light emitting diode (OLED) may include an electron injecting layer (EIL) on one side of the electron transport layer (ETL) to inject electrons and a hole injection layer (HIL) on one side of the hole transport layer (HTL) to inject holes. Furthermore, in a case of a phosphorescent organic light emitting diode (as opposed to a fluorescent organic light emitting diode), a hole blocking layer (HBL) may be selectively formed between the light emitting layer (EML) and the electron transport layer (ETL) and an electron blocking layer (EBL) may be selectively formed between the light emitting layer (EML) and the hole transport layer (HTL).

Figure 4:
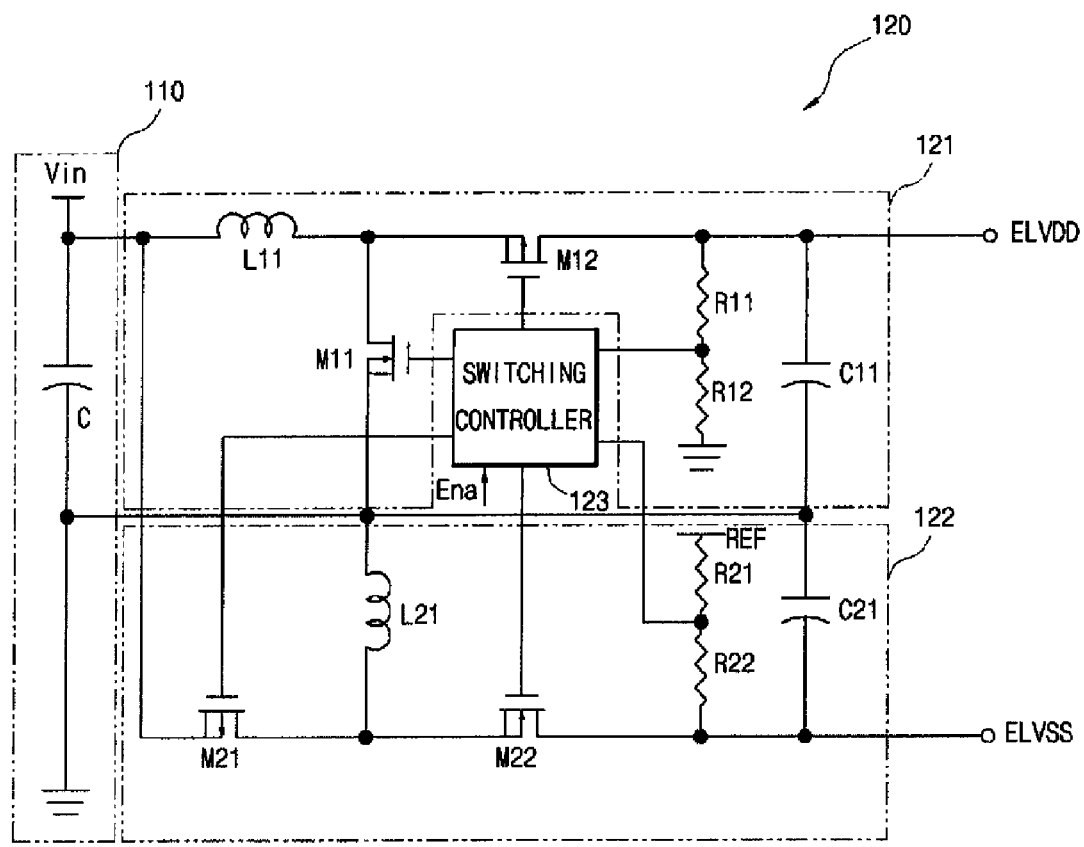
FIG. 4 is a circuit diagram illustrating an exemplary embodiment of the DC-DC converter.

FIG. 4 is a circuit diagram illustrating an exemplary embodiment of the DC-DC converter.

As illustrated in FIG. 4, the DC-DC converter 120 includes a boost converter 121, an inverter 122, and a switching controller 123. A power supplier 110 provides a DC power supply to the DC-DC converter 120. A reference symbol (ELVDD) denotes a positive power voltage, and a reference symbol (ELVSS) denotes a negative power voltage.

The boost converter 121 includes a first inductor L11 electrically coupled to the power supplier 110, a first switch M11 electrically coupled to the first inductor L11, a second switch M12 electrically coupled to the first inductor L11 and the first switch M11, first and second resistors R11 and R12 electrically coupled to the second switch M12, and a first capacitor C11 electrically coupled to the second switch M12.

Here, the first switch M11 may be an N-channel field-effect transistor and the second switch M12 may be a P-channel field-effect transistor but the invention is not limited thereto. For example, the first switch M11 may be a P-channel field-effect transistor and the second switch M12 may be an N-channel field-effect transistor. In any case, when the first switch M11 is turned on, the second switch M12 is turned off and when the first switch M11 is turned off, the second switch M12 is turned on.

The inverter 122 includes a third switch M21 electrically coupled to the power supplier 110, a second inductor L21 electrically coupled between the first switch M11 and the third switch M21, a fourth switch M22 electrically coupled between the third switch M21 and the second inductor L21, third and fourth resistors R21 and R22 electrically coupled to the fourth switch M22, and a second capacitor C21 electrically coupled to the fourth switch M22.

In the present embodiment, the third switch M21 is a P-channel field-effect transistor and the fourth switch M22 is an N-channel field-effect transistor, but the invention is not limited thereto. For example, the third switch M21 may be an N-channel field-effect transistor and the fourth switch M22 may be a P-channel field-effect transistor. In any case, when the third switch M21 is turned on, the fourth switch M22 is turned off and when the third switch M21 is turned off, the fourth switch M22 is turned on.

In addition, when the first switch M11 of the boost converter 121 is turned on, the third switch M21 of the inverter 122 is turned off and when the first switch M11 of the boost converter 121 is turned off, the third switch M21 of the inverter 122 is turned on.

The switching controller 123 controls the first switch M11 and the second switch M12 of the boost converter 121. Further, the switching controller 123 controls the third switch M21 and the fourth switch M22 of the inverter 122. In addition, an enable terminal (Ena) is electrically coupled to the switching controller 123. An enable signal is input to the enable terminal (Ena) to operate the switching controller 123 or a disable signal is input to the enable terminal Ena to stop the operation of the switching controller 123.

In one embodiment, the first switch M11 and the second switch M12 of the boost converter 121 and the third switch M21 and the fourth switch M22 of the inverter 122 may be integrated with the switching controller 123. That is, even though the first to fourth switches M11 to M22 are illustrated outside the switching converter in FIG. 4, the first to fourth switches M11 to M22 may be substantially integrated inside the switching controller 123. Therefore, according to the present embodiment of the invention, the size and weight of the overall DC-DC converter 120 may be considerably reduced.

In addition, a positive power voltage (ELVDD) is output through the boost converter 121 and a negative power voltage (ELVSS) is output through the inverter 122. The positive power voltage (ELVDD) and the negative power voltage (ELVSS) are supplied to the above-described organic light emitting display panel.

Figure 5:
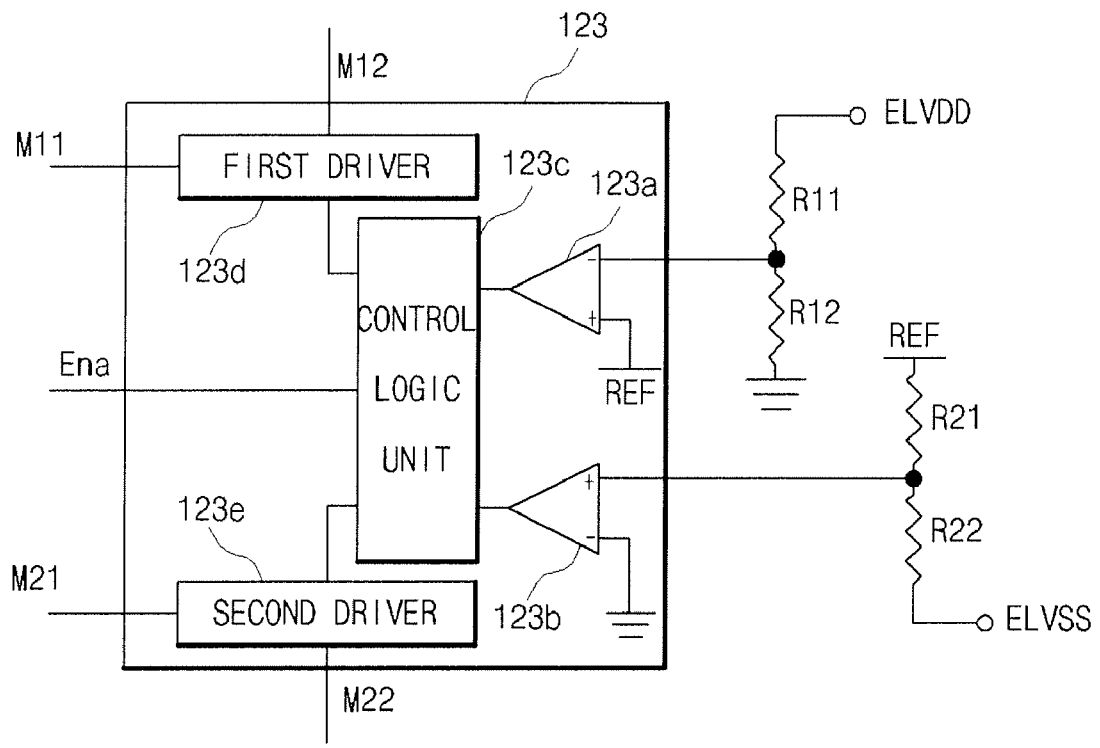
FIG. 5 is a block diagram illustrating an exemplary embodiment of the structure of a switching controller of the DC-DC converter.

FIG. 5 is a block diagram illustrating the structure of a switching controller of an embodiment of the DC-DC converter.

As illustrated in FIG. 5, the switching controller 123 includes a first comparator 123a, a second comparator 123b, a control logic unit 123c, a first driver 123d, and a second driver 123e.

An enable terminal (Ena) is electrically coupled to the control logic unit 123c so as to input an enable signal or a disable signal from outside.

The first comparator 123a is electrically coupled to a node between the first resistor R11 and the second resistor R12 of the boost converter 121. Therefore, a voltage divided by the first resistor R11 and the second resistor R12 is applied to the first comparator 123a. Accordingly, the first comparator 123a outputs a control signal to the control logic unit 123c so as to keep a first positive power voltage (ELVDD) to be substantially constant. Therefore, the control logic unit 123c outputs a control signal, which may be predetermined, to be electrically coupled to the first driver 123d. Further, switching frequencies of the first and second switches M11 and M12, which may be integrated with the switching controller 123 appropriately change, thereby enabling the substantially constant positive power voltage (ELVDD).

The second comparator 123b is electrically coupled to a node between the third resistor R21 and the fourth resistor R22 of the inverter 122. Therefore, a voltage divided by the third resistor R21 and the fourth resistor R22 is applied to the second comparator 123b. Accordingly, the second comparator 123b outputs a control signal to the control logic unit 123c so as to keep a negative power voltage (ELVSS) to be substantially constant. Therefore, the control logic unit 123c outputs a control signal, which may be predetermined, to be electrically coupled to the second driver 123e. Further, switching frequencies of the third and fourth switches M21 and M22, which may be integrated with the switching controller 123 appropriately change, thereby enabling the substantially constant negative power voltage (ELVSS).

Further, according to an embodiment of the present invention, when the enable signal is input through the enable terminal (Ena), the control logic unit 123c outputs control signals including an operation command to the first driver 123d and the second driver 123e so as to operate the first switch M11, the second switch M12, the third switch M21, and the fourth switch M22. However, when the disable signal is input through the enable terminal (Ena), the control logic unit 123c outputs control signals including an operation stop command to the first driver 123d and the second driver 123e so as not to operate the first switch M11, the second switch M12, the third switch M21, and the fourth switch M22. In particular, because the second switch M12 and the fourth switch M22 are turned off, the power supply is not provided to the organic light emitting display panel. That is, the DC-DC converter is truly shut off.

Figure 6:
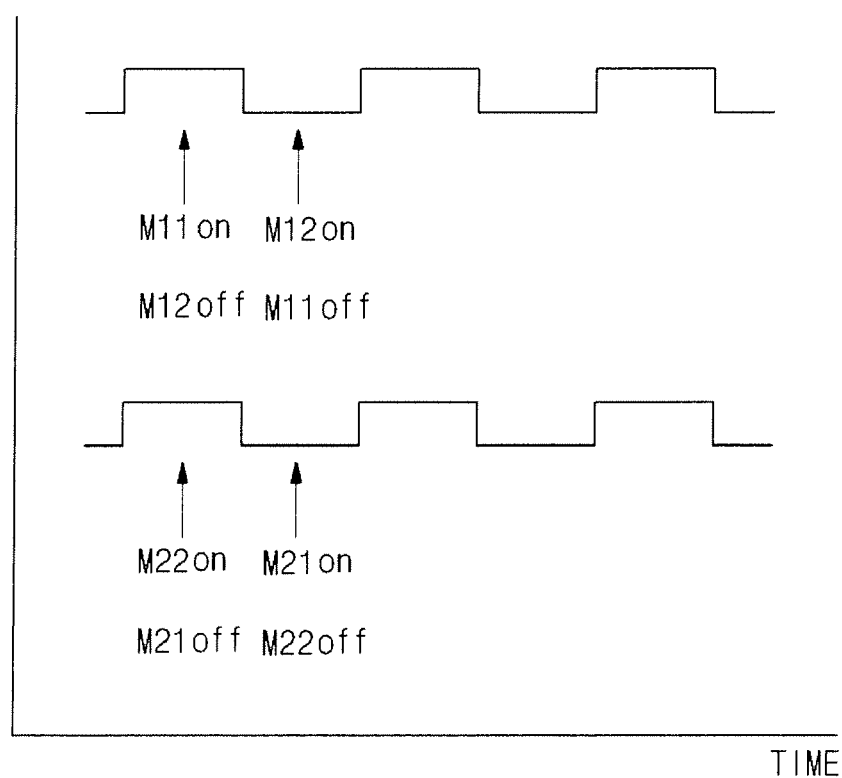

FIG. 6 is a graph illustrating the states in which the first switch and the second switch of the boost converter and the third switch and the fourth switch of the inverter included in the DC-DC converter are turned on.

As illustrated in FIG. 6, in the DC-DC converter, when the first switch M11 of the boost converter is turned on, the second switch M12 is turned off. Meanwhile, when the first switch M11 is turned off, the second switch M12 is turned on.

Further, when the third switch M21 of the inverter is turned on, the fourth switch M22 is turned off and when the third switch M21 is turned off, the fourth switch M22 is turned on.

On the other hand, as illustrated in FIG. 6, in the DC-DC converter, when the first switch M11 of the boost converter is turned on, the third switch M21 of the inverter 122 is turned off and when the first switch M11 of the boost converter is turned off, the third switch M21 of the inverter 122 is turned on.

FIGS. 7a to 7d are circuit diagrams illustrating the operation of the DC-DC converter.

In practice, the boost converter 121 and the inverter 122 operate concurrently. However, for the convenience of the description, the operation of the boost converter 121 will be described separately from the operation of the inverter 122.

Figure 7A:
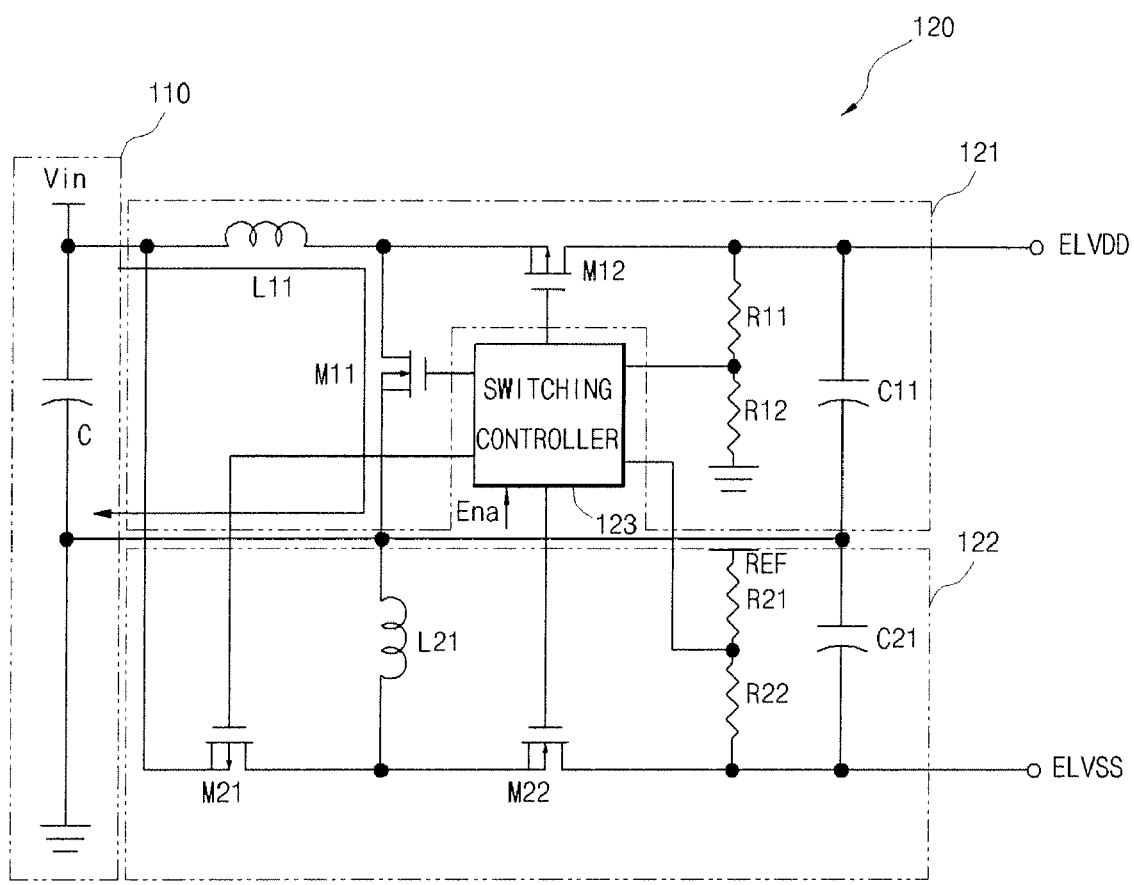
FIGS. 7a to 7d are circuit diagrams illustrating the operation of an exemplary embodiment of the DC-DC converter.

First, as illustrated in FIG. 7a, the switching controller 123 provides a signal at a high level to the first switch M11 and the second switch M12 of the boost converter 121. This way, the first switch M11 of the boost converter 121 is turned on and the second switch M12 of the boost converter 121 is turned off.

Therefore, a circuit loop through the first inductor L11 and the first switch M11 of the boost converter 121 is closed, as illustrated by the arrow in FIG. 7a. Accordingly, the power supply provided from the power supplier 110 is induced to the first inductor L11. That is, energy provided from the power supplier 110 is stored in the first inductor L11. At this time, the switching controller 123 adjusts a duty cycle with respect to the first switch M11 of the boost converter 121 so as to adjust the voltage drop across the first inductor L11. That is, a level of a voltage to be induced across the first inductor L11 varies depending on a period of time at which the first switch M11 is turned on.

Figure 7B:
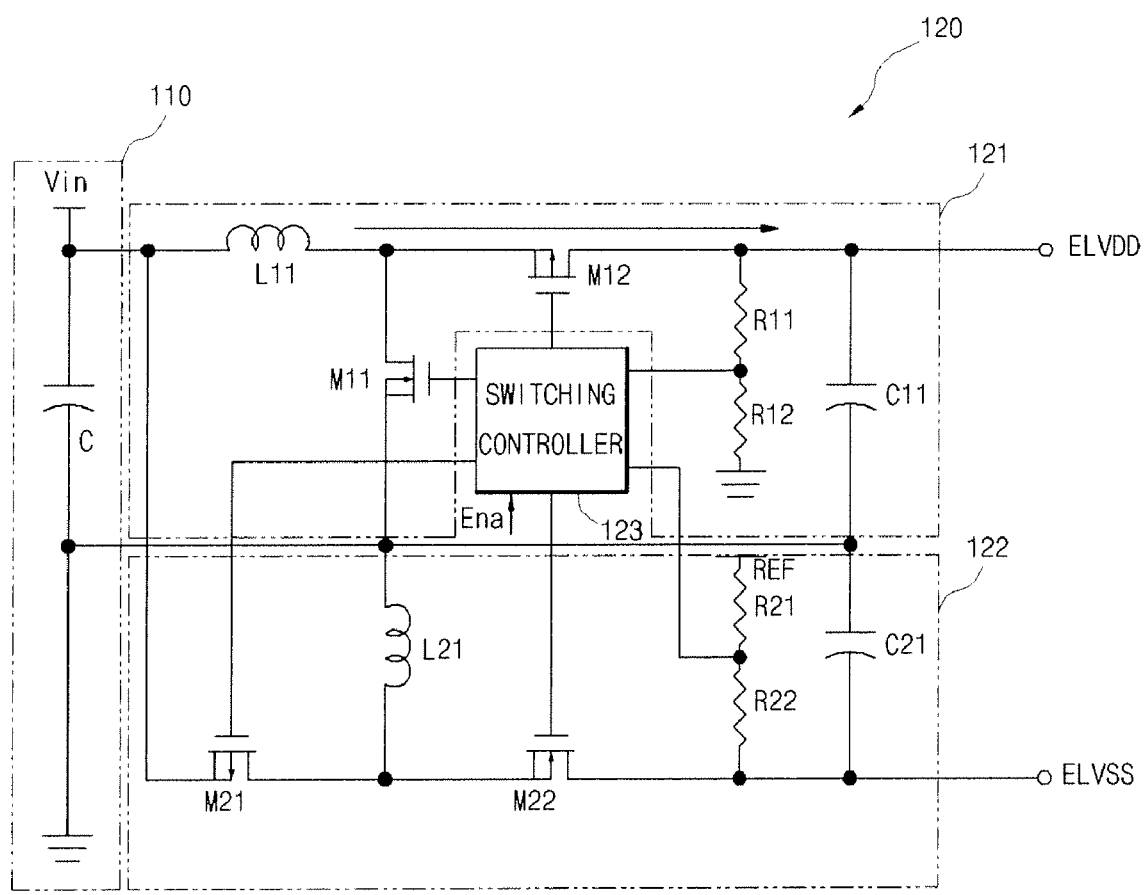

Next, as illustrated in FIG. 7b, the switching controller 123 provides a signal at a low level to the first switch M11 and the second switch M12 of the boost converter 121. This way, the first switch M11 of the boost converter 121 is turned off and the second switch M12 of the boost converter 121 is turned on.

Therefore, the input voltage modified by the voltage drop across the first inductor L11 of the boost converter 121 is applied to the first capacitor C11 through the second switch M12. That is, the positive power voltage is charged in the first capacitor C11. Furthermore, the second switch M12 and the first capacitor C11 output a positive power voltage (ELVDD) to the organic light emitting display panel.

Figure 7C:
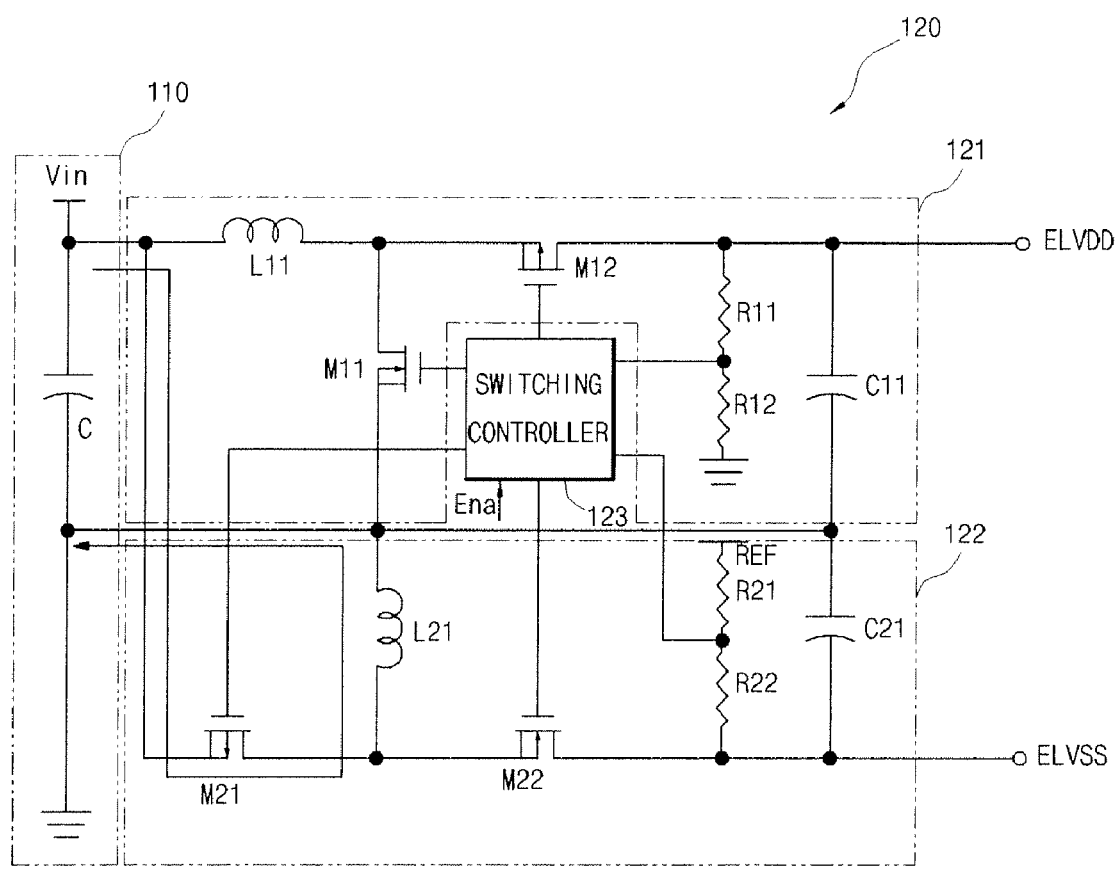

Next, as illustrated in FIG. 7c, the switching controller 123 provides a signal at a low level to the third switch M21 and the fourth switch M22 of the inverter 122. This way, the third switch M21 of the inverter 122 is turned on and the fourth switch M22 of the inverter 122 is turned off.

Therefore, a circuit loop through the third switch M21 and the second inductor L21 of the inverter 122 is closed, as illustrated by the arrow in FIG. 7c. Accordingly, the power supply provided from the power supplier 110 is induced to the second inductor L21. That is, energy provided from the power supplier 110 is stored in the second inductor L21. At this time, the switching controller 123 adjusts a duty cycle with respect to the third switch M21 of the inverter 122 so as to adjust the voltage drop across the second inductor L21. That is, a level of a voltage to be induced across the second inductor L21 varies depending on a period of time at which the third switch M21 is turned on.

Figure 7D:
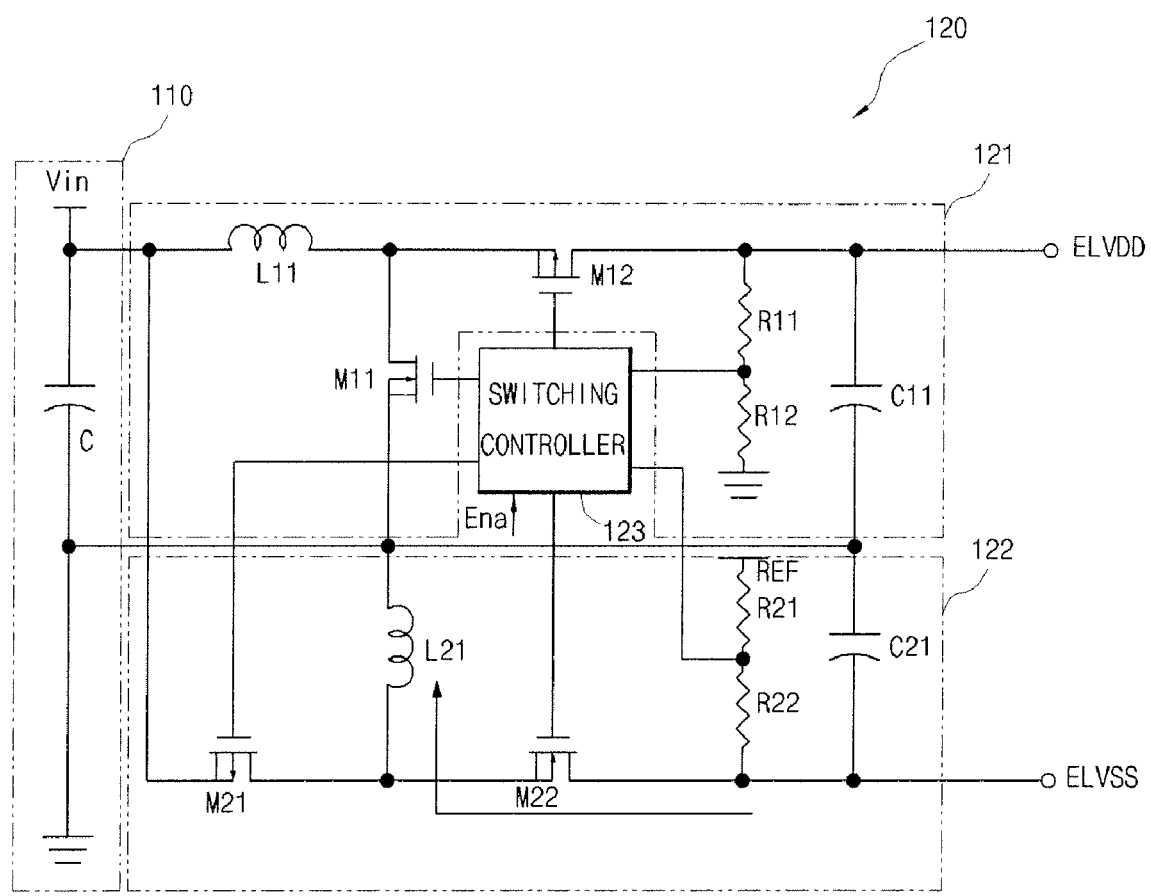

As illustrated in FIG. 7d, the switching controller 123 provides a signal at a high level to the third switch M21 and the fourth switch M22 of the inverter 122. This way, the third switch M21 of the inverter 122 is turned off and the fourth switch M22 of the inverter 122 is turned on.

Therefore, as a current through the second inductor L21 decreases, a voltage across the second inductor L21 of the inverter 122 is inverted and applied to the second capacitor C21 through the fourth switch M22. That is, the voltage across the second inductor L21 is inverted and charged in the second capacitor C21. Furthermore, the fourth switch M22 and the second capacitor C21 output a negative power voltage (ELVSS) to the organic light emitting display panel.

Figure 8:
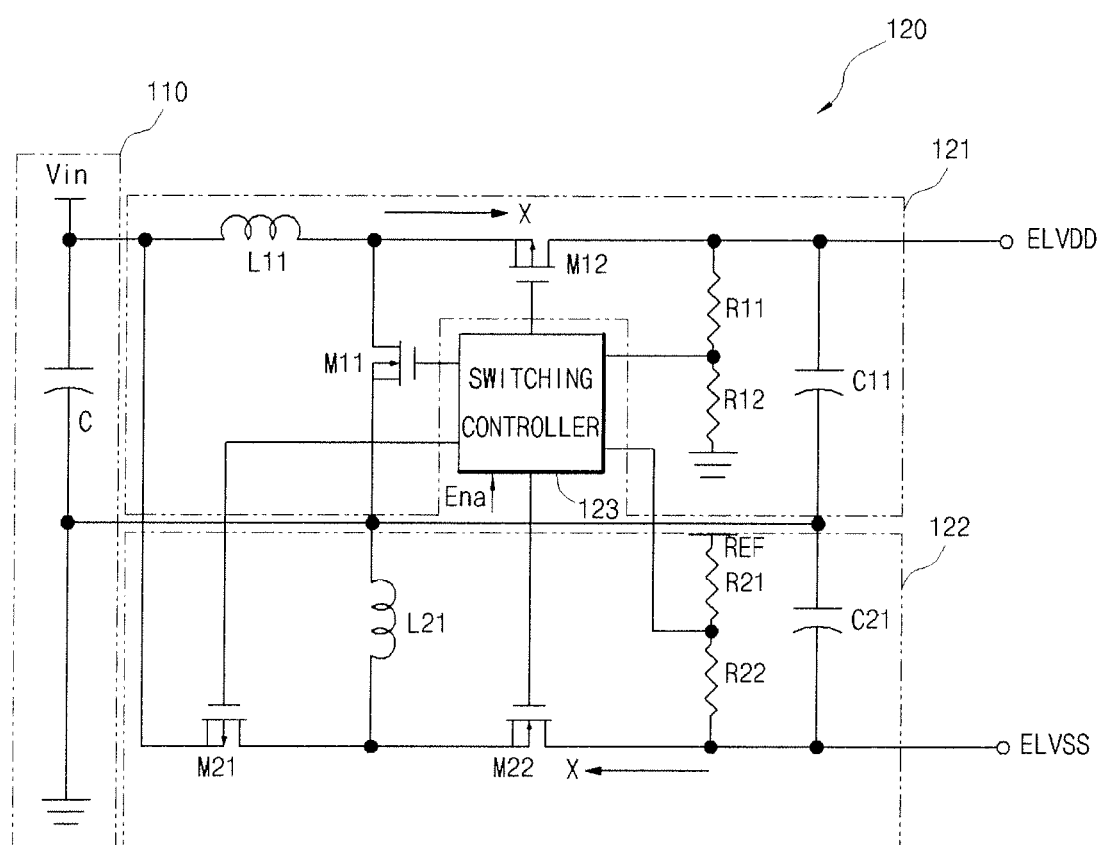
FIG. 8 is a circuit diagram illustrating another operation of an exemplary embodiment of the DC-DC converter.

FIG. 8 is a circuit diagram illustrating another operation of the DC-DC converter.

As illustrated in FIG. 8, a disable signal may be input to the enable terminal Ena, which is electrically coupled to the switching controller 123. For example, in order to completely stop the operation of the organic light emitting display 100, a disable signal may be input to the enable terminal (Ena). Thereafter, the switching controller 123 outputs a signal at a high level to the second switch M12 of the boost converter 121 and outputs a signal at a low level to the fourth switch M22 of the inverter 122. Accordingly, the second switch M12 of the boost converter 121 and the fourth switch M22 of the inverter 122 are turned off.

Therefore, the power supply provided from the power supplier 110 is not provided to the organic light emitting display panel through the second switch M12 and the fourth switch M22. In other words, the DC-DC converter is truly shut down. Accordingly, it is possible to reduce the overall power consumption of the organic light emitting display and to decrease the deterioration of the organic light emitting display.

Figure 9A:
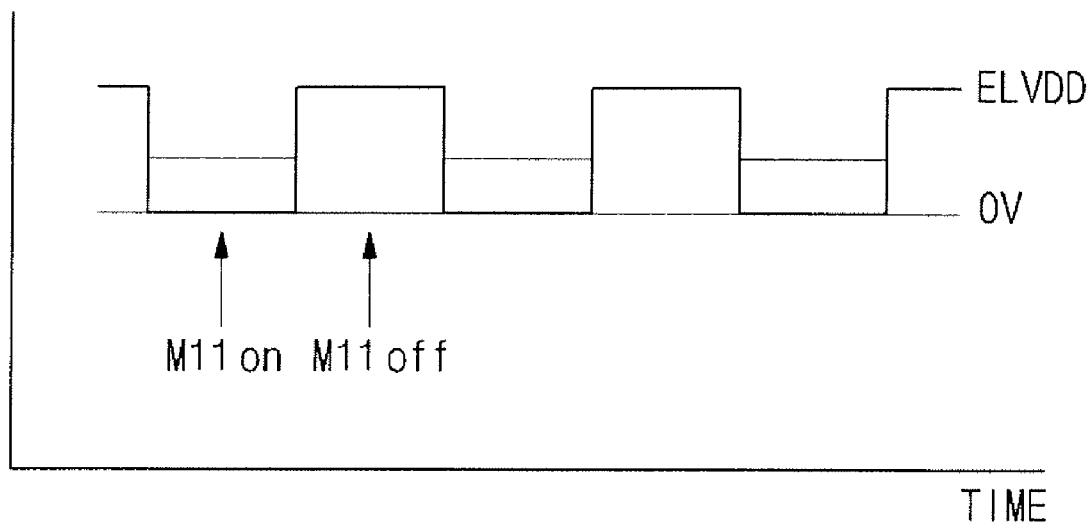
FIGS. 9a and 9b are graphs illustrating waveforms of a positive power voltage and a negative power voltage output from an exemplary embodiment of the DC-DC converter.
Figure 9B:
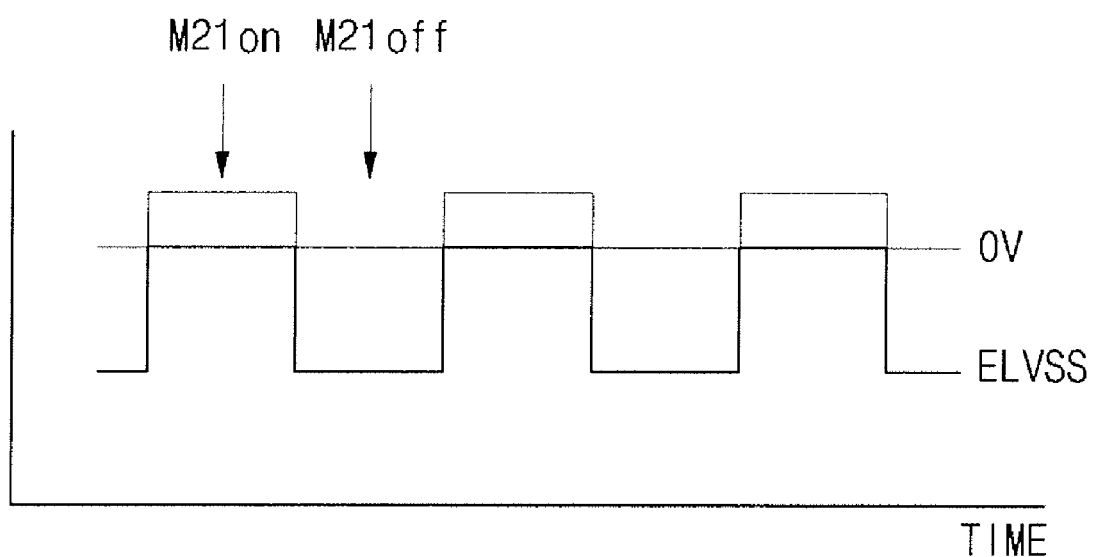

FIGS. 9a to 9b are graphs illustrating waveforms of a positive power voltage and a negative power voltage output from the DC-DC converter. Here, FIG. 9a shows a waveform of the voltage input to the second switch M12 but not supplied to the first capacitor C11, and FIG. 9b shows a waveform of the voltage input to the fourth switch M22 but not supplied to the second capacitor C21. Substantially, the positive power voltage (ELVDD) to be applied to the organic light emitting display panel is an approximately smooth direct current voltage because the voltage is stored in the first capacitor C11 and the negative power voltage (ELVSS) is an approximately smooth direct current voltage because the voltage is stored in the second capacitor C21.

First, as illustrated in FIG. 9a, when the first switch M11 of the boost converter 121 is turned off, the positive power voltage (ELVDD) stored in the first inductor L11 is output. Here, the positive power voltage (ELVDD) may be obtained by using the following Equation 1.

$$(ELVDD)=Vin/(1-D) \qquad \text{Equation 1}$$

Here, reference symbol Vin denotes an input voltage applied from the power supplier 110 and reference symbol D denotes the duty cycle.

Next, as illustrated in FIG. 9b, when the third switch M21 of the inverter 122 is turned off, the negative power voltage (ELVSS) stored in the second inductor L21 is output. Here, the negative power voltage (ELVSS) may be obtained by using following Equation 2.

$$(ELVSS)=(D*Vin)/(1-D) \qquad \text{Equation 2}$$

As described above, the negative power voltage (ELVSS) is determined by using Equation 2. In particular, in the range of D>0.5, the absolute value of the negative power voltage (ELVSS) is larger than the input voltage Vin and in the range of D<0.5, the absolute value of the negative power voltage (ELVSS) is smaller than the input voltage Vin. In an exemplary embodiment according to the invention, the P-channel transistor is adopted in the inverter 122 and the duty cycle is controlled to be larger than 0.5. Therefore, the negative power voltage (ELVSS) having an absolute value larger than the input value is output. In other words, if it is assumed that a desired negative power voltage (ELVSS) is approximately −6V, the inverter 122 raises an input voltage from approximately 3V to 6V, inverts the input voltage into the negative power voltage (ELVSS), and outputs the inverted voltage.

Therefore, according to this embodiment of the invention, the freewheel diode from a conventional DC-DC converter may be replaced with a switch having a low voltage drop. Therefore, it is possible to provide a DC-DC converter having lower power consumption.

Further, according to an embodiment of the invention, it is possible to supply a light-weight and small size DC-DC converter by integrating the freewheel diode with a switching controller while replacing the freewheel diode with the switch.

Further, according to an embodiment of the invention, it is possible to supply a DC-DC converter which is truly shut down by using a switch in a boost converter and a switch in an inverter, which function as the freewheel diode, to be turned off when the switching controller does not operate.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is clamed is:

1. An organic light emitting display having a power supplier, a DC-DC converter, a scan driver, a data driver, and an organic light emitting display panel, wherein the DC-DC converter comprises:
   a boost converter comprising a first switch electrically coupled to the power supplier and a second switch electrically coupled to the power supplier, the first switch, and the organic light emitting display panel, the second switch being configured to output a positive power voltage to the organic light emitting display panel;
   an inverter comprising a third switch electrically coupled to the power supplier and a fourth switch electrically coupled to the third switch and the organic light emitting display panel; and
   a switching controller electrically coupled to the boost converter and the inverter,
   wherein the boost converter and the inverter are adapted such that at any one time, no more than one of the first switch or the third switch is turned on, and
   wherein power from the power supplier is not supplied to the organic light emitting display panel when the second switch and the fourth switch are both turned off.

2. The organic light emitting display as claimed in claim 1, wherein the first switch, the second switch, the third switch, and the fourth switch are integrated with the switching controller.

3. The organic light emitting display as claimed in claim 1, wherein the boost converter further comprises a first inductor electrically coupled to the power supplier, the first switch, and the second switch.

4. The organic light emitting display as claimed in claim 1, wherein the boost converter further comprises a first capacitor electrically coupled to the second switch and the organic light emitting display panel.

5. The organic light emitting display as claimed in claim 1, wherein the inverter further comprises a second inductor electrically coupled to the first switch, the third switch, and the fourth switch.

6. The organic light emitting display as claimed in claim 1, wherein the inverter further comprises a second capacitor electrically coupled to the fourth switch and the organic light emitting display panel.

7. The organic light emitting display as claimed in claim 1, wherein the second switch is coupled to a first resistor and a second resistor in series; and
   a node between the first resistor and the second resistor is electrically coupled to the switching controller.

8. The organic light emitting display as claimed in claim 7, wherein the switching controller comprises a first comparator electrically coupled to the node between the first resistor and the second resistor.

9. The organic light emitting display as claimed in claim 1, wherein the fourth switch is coupled to a third resistor and a fourth resistor in series; and
   a node between the third resistor and the fourth resistor is electrically coupled to the switching controller.

10. The organic light emitting display as claimed in claim 9, wherein the switching controller comprises a second comparator electrically coupled to the node between the third resistor and the fourth resistor.

11. The organic light emitting display as claimed in claim 1, wherein the switching controller has an enable terminal; and wherein the switching controller is adapted to turn off the second switch and the fourth switch when a disable signal is input to the switching controller through the enable terminal.

12. The organic light emitting display as claimed in claim 1,
wherein the first switch comprises an N-channel field-effect transistor having a control electrode, and the second switch comprises a P-channel field-effect transistor having a control electrode.

13. The organic light emitting display as claimed in claim 12,
wherein the switching controller comprises a first driver, which supplies a same control signal to the first switch and the second switch.

14. The organic light emitting display as claimed in claim 1,
wherein the third switch comprises a P-channel field-effect transistor having a control electrode, and the fourth switch comprises an N-channel field-effect transistor having a control electrode.

15. The organic light emitting display as claimed in claim 14,
wherein the switching controller comprises a second driver, which supplies a same control signal to the third switch and the fourth switch.

16. The organic light emitting display as claimed in claim 1,
wherein the boost converter is adapted such that at any one time, no more than one of the first switch or the second switch is turned on.

17. The organic light emitting display as claimed in claim 1,
wherein the inverter is adapted such that at any one time, no more than one of the third switch or the fourth switch is turned on.

18. The organic light emitting display as claimed in claim 1,
wherein the fourth switch outputs a negative power voltage to the organic light emitting display panel.

19. The organic light emitting display as claimed in claim 1,
wherein the organic light emitting display panel comprises:
a switch electrically coupled to the scan driver and the data driver, through a scan line and a data line, respectively;
a capacitor electrically coupled to the switch;
a driving transistor electrically coupled to the capacitor; and
an organic light emitting diode electrically coupled to the driving transistor.

20. The organic light emitting display as claimed in claim 19,
wherein the driving transistor and the organic light emitting diode are electrically coupled to the DC-DC converter.

21. The organic light emitting display as claimed in claim 19,
wherein the driving transistor is electrically coupled to the boost converter, and the organic light emitting diode is electrically coupled to the inverter.

* * * * *